United States Patent [19]

Burley

[11] 4,249,979
[45] Feb. 10, 1981

[54] PLY FOLDING BLADDER

[75] Inventor: George J. Burley, Clinton, Ohio

[73] Assignee: The Firestone Tire & Rubber Company, Akron, Ohio

[21] Appl. No.: 36,625

[22] Filed: May 7, 1979

Related U.S. Application Data

[63] Continuation-in-part of Ser. No. 917,619, Jun. 16, 1978.

[51] Int. Cl.³ .......................................... B29H 17/00
[52] U.S. Cl. .................................. 156/412; 156/401; 156/416
[58] Field of Search ................. 156/123, 124, 128 N, 156/132, 133, 394, 400–402, 412, 414, 416, 443, 444, 460, 465; 92/92, 103 F; 270/69; 152/361 R, 361 FP

[56] References Cited

U.S. PATENT DOCUMENTS

| | | | |
|---|---|---|---|
| 3,111,443 | 11/1963 | Vanzo et al. | 156/401 |
| 3,154,455 | 10/1964 | Nebout | 156/443 |
| 3,560,301 | 2/1971 | Cantarutti | 156/401 |
| 3,562,062 | 2/1971 | Bryant | 156/401 |
| 3,831,657 | 8/1974 | Dillenschneider | 152/361 FP |
| 3,966,536 | 6/1976 | Schmitt | 156/401 |
| 4,063,987 | 12/1977 | Irie et al. | 156/417 |
| 4,087,306 | 5/1978 | Head et al. | 156/401 |

Primary Examiner—John E. Kittle

[57] ABSTRACT

There is disclosed an inflatable bladder for axially folding a ply at the shoulder of a drum, the body of which bladder carries ply-lifting fingers, as well as a ply-folding wedge in its surface. Inflating means causes the fingers and wedge, after initial expansion of the bladder, to establish and maintain fixed positions against the ply, whereupon the wedge turns a corner carrying the fabric with it. The method of operation is similarly disclosed.

6 Claims, 6 Drawing Figures

PLY FOLDING BLADDER

CROSS-REFERENCE

This application is a continuation-in-part of application Ser. No. 917,619, filed June 16, 1978 for "PLY FOLDING BLADDER".

BACKGROUND OF THE INVENTION

It is common practice in the building of tires to fold the edges of unvulcanized, rubberized ply material around, for example, bead wire bundles by the use of inflatable bladders located on the tire building drum. In use they are inflated and moved or rolled axially of the drum either by means of an axially movable cage, a curved surface known as a can, or a second inflatable bladder.

While it is relatively simple to fold a ply around a rigid member such as a circumferential wire bead bundle by means of a bladder, the matter becomes complicated where a ply is to be folded upon itself or around the edge of another ply. In the latter situation, since no back-up material is present against which the ply may be folded, the best previously known method for initiating and folding a ply along a true circumferential line has been the manual method.

This time-consuming process involves the use of two hands, limiting the work area to one edge at a time; it also creates localized and irregular material-distortion, resulting in uneven folds, wrinkles and trapped air.

The object of the present invention is to provide apparatus for initiating and forming sharp, uniform circumferential folds in tire ply material which is turned upon itself or around the edges of other ply material, without the need for pre-creasing or separate pusher elements. Of particular benefit in building tire-belt units comprising rubberized cord-material, there is provided, according to the invention, an annular inflatable bladder anchored circumferentially on a building drum and provided with certain external, shaped members which aid in folding the fabric ply uniformly and wrinkle-free along a true circumferential line.

An example of the construction in which ply material is folded about a rigid member is seen in U.S. Pat. No. 3,111,443 to Vanzo et al, wherein bladder chambers at the shoulders of the tire building drum are inflated and caused to fold ply material around a wire-bead by the axial motion of a tubular pusher-can or -bell. There is no teaching of a fabric-folding without the back-up or anchorage of a rigid bead-member, nor use of a bladder without an axial pusher-means.

In U.S. Pat. No. 3,560,301 to Cantarutti there is shown similar ply-folding, but only around a rigid bead-member, as well as a pushing of the bladder axially, in this instance by a second inflatable bladder.

Attempts have been made to anchor the ply material out to the intended fold-line, without a rigid bead, such as by the application of a vacuum, shown in U.S. Pat. No. 3,154,455 to Nebout, but the folding action is again caused by an axially moving rigid sleeve.

Another method of anchoring the ply material is shown in U.S. Pat. No. 3,966,536, to Schmitt, wherein the material is first adhesively secured to its underlying support body, out to the intended fold-line. However, the crease in the material is actually started by moving a profiled stitcher-roller along the underlying support body and against the edge of the cylindrical bell.

U.S. Pat. No. 4,087,306 to Head et al discloses a turn-up bladder having an uninterrupted cylindrical wall and varying zones of body construction, but without the lifting and turning members of the present invention.

BRIEF DESCRIPTION OF THE DRAWINGS

Further objects of the invention will appear by reference to the accompanying drawings in which:

FIG. 6 is a view, partially in section and perspective, of a portion of the bladder in place, shown slightly inflated.

DESCRIPTION OF A PREFERRED EMBODIMENT

Figure 1:
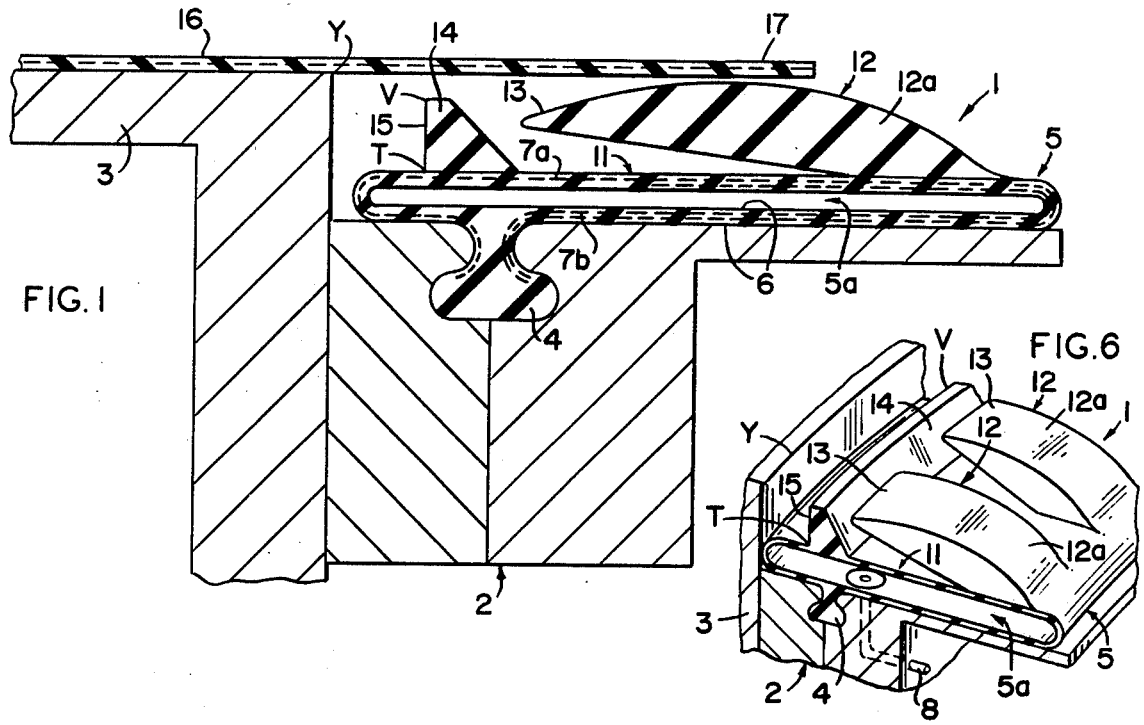
FIG. 1 is a sectional view of the bladder, in place.

Referring first to FIG. 1 an inflatable, annular bladder 1 is seated circumferentially on an axial support-member 2 offset radially from shoulder Y of a cylindrical building support or shell 3. The bladder is anchored for pivoting by a bead 4 clamped within the member 2. The location of bead 4 with relation to the axial length and features of the bladder surface is important to the pivoting operation of the bladder, as will appear hereafter.

The bladder body 5 is in the nature of a tube having outer and inner rubber layers 6, and a wall comprised of one or more plies of rubberized fabric. It was found particularly useful to provide a first fabric ply 7a completely encircling the inflatable chamber 5a, and a second fabric ply 7b extending only about a portion of the bladder body, in order to provide controlled expansion of the bladder-body under inflation; the cords of plies 7a and 7b, respectively, usefully make an angle of about 10° with each other. Valve 8 through the body 5 provides for inflation and deflation of the bladder. It was found useful, to attain rapid deflation, to provide a plurality of such valves around the bladder circumference.

The radially outer surface 11 of the bladder is provided with two separate means to accomplish the folding to be described. The first such means is a lifting wing 12, which may be comprised of circumferentially spaced segments 12a made of a relatively rigid rubbery material and anchored in the surface 11, and having their free ends or fingers 13 directly axially inwardly toward shell 3. The second folding means comprises a circumferentially continuous, resilient turning wedge 14, anchored in bladder surface 11 and having a substantially radially extending surface 15, normally directed axially inwardly toward shell 3 when the bladder is uninflated.

In the uninflated condition of the bladder 1 (FIGS. 1 and 2) its wing 12 and wedge 14 do not obstruct the placement on the drum 3 of the rubberized cord ply material 16, which extends with an overhanging end 17 over the bladder to a point just beyond the hump on wing 12. When it is desired to fold the fabric, air is admitted in a controlled manner through valve 8 into the interior of the bladder.

Figure 3:
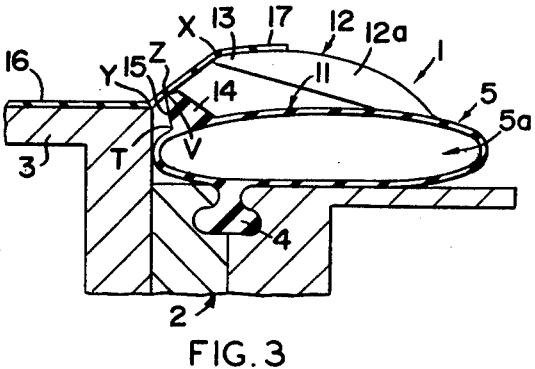

In the first stage of bladder expansion, the wing 12 rises slightly and lifts the overhanging end 17 of ply material 16 slightly radially outwardly, while simultaneously applying slight axial outward tension to it. This action maintains the ply material taut without lifting it away from drum-corner Y and, for the moment, out of contact with the rising wedge 14. The bead 4, being anchored in the member 2, provides a pivot-point for the bladder which thereafter, under increasing inflation, will round out, i.e. its center will move axially inwardly and radially outwardly. In FIG. 3, the wing 12 has started to move axially inwardly of the drum, thereby establishing its contact with the rubberized fabric at a contact-line X. This contact is maintained constant until wedge 14 establishes its grip on the fabric at drum-core Y, now to be explained.

The shape of wedge 14, and its location on the bladder with respect to the bladder pivot point, are so designed that its radially outer corner-line V engages the fabric at line Z before the radially inner corner-line T engages the fabric at drum-corner Y.

As inflation increases, the entire face of the wedge 14 engages the fabric, anchoring it at drum-corner Y, while maintaining its contact with fabric until the fold is completed.

Figure 4:
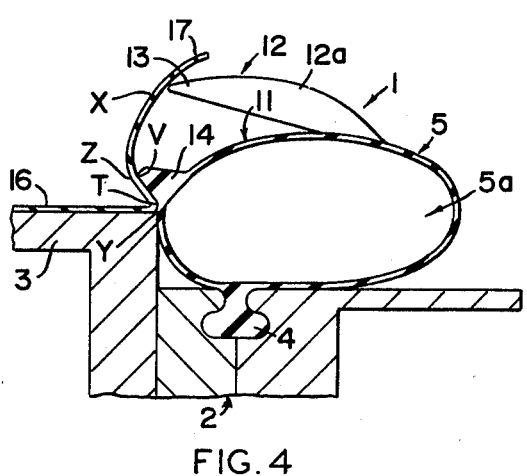

With wedge 14 in control, further inflation causes the end 17 of the fabric to slip over finger-ends 13, as seen in FIG. 4.

Figure 5:
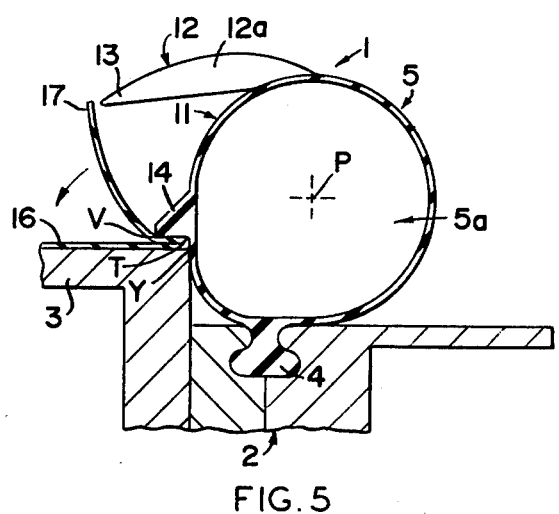

As the bladder continues to inflate and round out beyond the stage of FIG. 4, the rounded condition of FIG. 5 is reached, where the center P of the bladder has moved so far radially outwardly of the wedge 14, that the wedge finds itself in a location on the bladder which, with increasing inflation, will move the wedge radially inwardly.

In other words, the wedge has, from FIG. 4 to FIG. 5, turned the corner, established an exact fold circumferentially of the drum, and at this stage presses the fold tightly. At the same time, the end 17 of the folded material has been pushed so far axially inwardly of the building drum by the wing 12 that the resiliency of the rubberized fabric will cause it to snap down.

Figure 2:
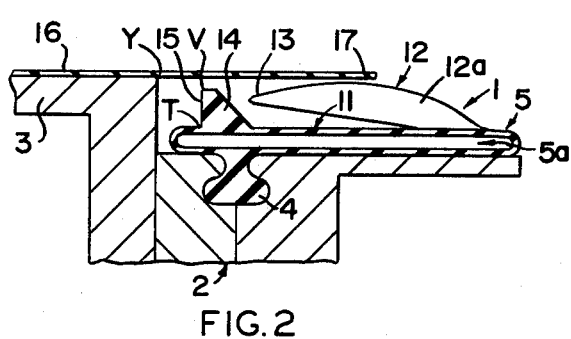
FIGS. 2–5 are a schematic sectional views, showing the bladder in place and at various stages of its operation.

Upon deflation, the bladder will return to the condition of FIG. 2.

The device herein has been described as being air-inflated, but it will be obvious that movement of the lifting and turning members may be accomplished through expansion of the bladder by the use of other fluids.

With a useful embodiment of the invention, folding was accomplished on a 0.11 cm thick ply of rubberized aramid cord material 16, the ply-end 17 over-hanging the end of tire building drum 3 by about 5–6.4 cm. The drum 3 has an outer diameter of 60.5 cm, while the axial support 2 has an outer diameter of 56.6 cm, thus providing a radial offset to the drum-corner Y of 0.95 cm.

The body 5 of bladder 1 has a durometer hardness of about 75. Its wall gauge is about 0.16 cm where it is comprised of two plies of bias-cord material, and about 0.12 cm where it is comprised of only one ply 7a. The axially left edge of the bladder, as viewed in FIG. 1, will be used as the indexing point for various measurements to follow. Thus, the ply 7b extends around the bladder to a point about 5 cm from that left edge. The entire axial bladder-width is about 9.6 cm. The bladder-bead 4 is anchored with its center about 1.6 cm from the left edge corresponding to about 2.2 cm from the radial offset.

Turning to the radially outer surface of the bladder, the lifting finger-segments 12a have a durometer hardness of about 80, an axial length of about 7 cm, and a circumferential width each substantially equal to their circumferential spacing, namely about 3.2 cm. Their axially inner ends are spaced about 2.4 cm from the left edge, and the axially extending open spaces under the fingers extend to about 7.1 cm from the left edge. The turning wedge 14 has a durometer hardness of about 80; its surface 15 is located 1.3 cm from the left edge, and rises radially 0.76 cm from the bladder surface.

Air at 5.6 kg/cm$^2$ pressure was admitted for 2.5 seconds to inflate the bladder and accomplish the folding of ply 16. Upon release of the air-pressure, the bladder returns relatively more slowly to its original position (FIG. 2).

Various other modifications will occur to those skilled in the art without departing from the invention concept.

What is claimed is:

1. A bladder for forming an axial fold in the unvulcanized, rubbery overhang of ply material extending unsupported beyond the shoulder of a cylindrical drum, comprising:
    an inflatable annular body located radially inwardly and axially outwardly of the shoulder;
    means anchoring said body;
    circumferentially spaced, axially inwardly directed lifting fingers on said body;
    a circumferentially continuous wedge on said body between the shoulder and said fingers, said wedge having an axially inwardly facing surface in the uninflated condition of said body; and
    inflation means to move said fingers initially to lift the overhang radially and axially outwardly, thereafter to establish a circumferential line of substantially fixed contact points between said fingers and the overhang; and to move said wedge radially outwardly initially to establish and maintain engagement between its said surface and a substantially fixed circumferential area of the overhang, thereafter to turn said surface and the area together radially inwardly, and fold the overhang.

2. A bladder for axially folding a ply at the shoulder of a cylindrical drum, comprising:
    an expandable body under the ply;
    an anchor securing said body;
    first ply-lifting means on said body;
    second ply-turning means having a generally radially extending axially inwardly facing surface located between said lifting means and the shoulder; and
    expansion means to
      move said first and second means successively against the ply adjacent the drum shoulder, and thereafter to
      move the said radial surface of said second means axially and radially inwardly gradually engaging a portion of the ply and folding it.

3. A bladder for axially folding a ply at the shoulder of a cylindrical drum, comprising:
    an inflatable body under the ply;
    means anchoring said body;
    first circumferentially spaced ply-lifting members on said body;
    a second circumferentially continuous ply-turning member having a generally radially extending axially inwardly facing surface located between said lifting members and the shoulder; and
    inflation means to
      move said first and second members successively against the ply adjacent the drum shoulder, and thereafter to
      move the said radial surface of said second member axially and radially inwardly gradually engaging a portion of the ply and folding it.

4. A bladder for axially folding an unvulcanized, rubbery ply at the shoulder of a cylindrical drum, comprising:
- an inflatable body under the ply
- a bed anchoring said body,
- first circumferential ply-lifting members on said body,
- a second ply-turning member having a generally radially extending axially inwardly facing surface located between said lifting members and the shoulder; and
- inflation means to
  - move said first and second members successively adjacent the drum shoulder against the ply, and thereafter to
  - turn said second members axially and radially inwardly gradually engaging a portion of the ply and folding it.

5. A bladder for axially folding a ply at the shoulder of a cylindrical drum, comprising:
- an inflatable body under the ply;
- means anchoring said body;
- first circumferentially spaced ply-lifting members on said body,
- a second ply-turning member having a generally radially extending axially inwardly facing surface located between said lifting members and the shoulder; and
- inflation means to
  - move said first and second means successively against the ply adjacent the drum shoulder, and thereafter to
  - move the said radial surface of said second means axially and radially inwardly gradually engaging a portion of the ply and folding it;
- said lifting members comprising fingers having axially inwardly directed free ends and outer ends fastened to said body; and
- said ply-turning member being circumferentially continuous.

6. A bladder for forming an axial fold in the overhang of a ply extending unsupported beyond the shoulder of a cylindrical drum, comprising:
- an inflatable annular body located radially inwardly and axially outwardly of the shoulder;
- means anchoring said body;
- a circumferential lifting member of said body;
- a circumferential turning member on said body between the shoulder and said lifting member, said turning member having a generally radially extending axially inwardly facing surface in the uninflated condition of said body;
- inflation means to
  - move said lifting member initially to lift the overhang radially and axially outwardly, thereafter to establish a fixed circumferential line of contact between said lifting member and the overhang; and to
  - move said turning member radially outwardly initially to establish and maintain engagement between its said radial surface and a fixed circumferential area of the overhang, thereafter to turn said surface and the area together axially and radially inwardly, folding the overhang.

* * * * *

UNITED STATES PATENT AND TRADEMARK OFFICE
CERTIFICATE OF CORRECTION

PATENT NO. : 4,249,979
DATED : February 10, 1981
INVENTOR(S) : George J. Burley

It is certified that error appears in the above-identified patent and that said Letters Patent are hereby corrected as shown below:

Column 2, line 47

"directly" should read --directed--

Column 5, line 5

"bed" should read --bead--

Signed and Sealed this

Fifth Day of May 1981

[SEAL]

Attest:

RENE D. TEGTMEYER

Attesting Officer     Acting Commissioner of Patents and Trademarks